United States Patent
Hoefnagels et al.

[15] 3,696,098
[45] Oct. 3, 1972

[54] PHOTOCHROMIC POLYCONDENSATES OF THE INDOLINOSPIROPYRAN TYPE

[72] Inventors: Jan Antonius Hoefnagels, Berchem, Belgium; Norman H. Hiatt, Hamden, Conn. 06514; Georges Joseph Smets, Heverlee, Belgium

[73] Assignee: Gevaert-AGFA N.V., Mortsel, Belgium

[22] Filed: June 10, 1970

[21] Appl. No.: 45,268

[30] Foreign Application Priority Data

July 11, 1969 Great Britain..........35,134/69

[52] U.S. Cl.....................260/240 R, 88/106, 96/5, 96/44, 96/89, 96/90, 117/33.3, 252/300, 260/67.5, 260/240 D, 260/326.11, 350/160
[51] Int. Cl.............................................C07d 27/38
[58] Field of Search .260/240 D, 240 R, 326.11, 67.5

[56] References Cited

FOREIGN PATENTS OR APPLICATIONS 1,451,332  7/1966  France..................260/326.11

OTHER PUBLICATIONS

Chemical Abstracts Vol. 68, page 3347, abstract No. 34393z (1968).

Primary Examiner—John D. Randolph
Attorney—Brufsky, Staas, Breiner and Halsey

[57] ABSTRACT

A polycondensate is described having the formula

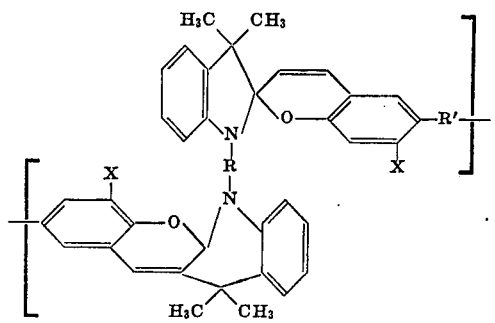

wherein:
R represents

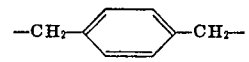

$-CH_2-CH_2-O-CH_2-CH_2-$, $-CH_2-CH=CH-CH_2-$, or $-(CH_2)_n-$ wherein $n$ is 2 or an integer from 4 to 10,
X represents a hydrogen atom or a nitro group, and
R' represents a single bond or a methylene group.
The polycondensates are photochromic and are reversibly colored upon exposure to ultraviolet radiation.

11 Claims, No Drawings

PHOTOCHROMIC POLYCONDENSATES OF THE INDOLINOSPIROPYRAN TYPE

The invention relates to new photochromic polycondensates of the indolino-spiropyran type.

According to the invention photochromic polycondensates of the indolino-spiropyran type are provided, which by themselves are reversibly colored upon exposure to ultraviolet radiation, characterized thereby that they are formed of recurring units corresponding to the general formula:

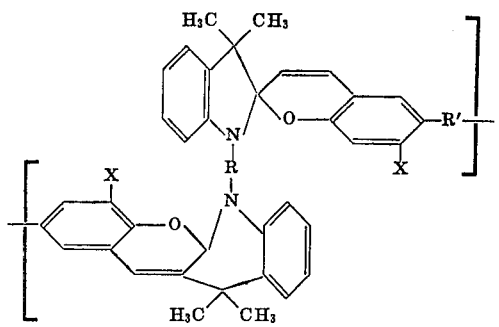

wherein:

R represents

—CH₂—CH₂—O—CH₂—CH₂—, —CH₂—CH=CH—CH₂—, or —(CH₂)$_n$— wherein $n$ is 2 or an integer from 4 to 10, X represents a hydrogen atom or a nitro group, and R' represents a single bond or a methylene group.

The photochromic polycondensates of the indolino-spiropyran type of the present invention are prepared by refluxing in a common solvent equimolecular amounts of a bis-3H-indole base or a bis-3H-indolium salt and a di-salicylaldehyde.

Valuable bis-3H-indole bases and bis-3H-indolium salts are:

1,1'-(p-phenylenedimethylene)-bis(3,3-dimethyl-2-methylene-indoline)

1,1'(pentamethylene)-bis(2,3,3-trimethyl-3H-indolium iodide)

1,1'(decamethylene)-bis(2,3,3-trimethyl-3H-indolium iodide)

1,1'(tetramethylene)-bis(2,3,3-trimethyl-3H-indolium bromide)

1,1'(ethylene)-bis(2,3,3-trimethyl-3H-indolium bromide)

1,1'(2-butenylene)-bis(2,3,3-trimethyl-3H-indolium bromide)

β, β'-bis[1-(2,3,3-trimethyl)-3H-indolium iodide]-diethyl ether

Suitable disalicylaldehydes are:

5,5'-disalicylaldehyde 3,3'-dinitro-5,5'-disalicylaldehyde 5,5'-methylene-disalicylaldehyde 5,5'-methylene-3,3'-dinitro-disalicylaldehyde The bis-3H-indole bases and bis-3H-indolium salts were prepared as follows:

A. preparation of 1,1'(p-phenylenedimethylene)-bis(3,3-dimethyl-2-methylene-indoline)

0.1 mole of α,α'-dibromo-p-phenylenedimethylene and 0.2 mole of 2,3,3-trimethyl-3H-indole are refluxed in 0.5 liter methylethylketone for 24 hours. After refluxing the quaternary salt 1,1'(p-phenylenedimethylene)-bis(2,3,3-trimethyl-3H-indolium bromide) was isolated and recrystallized from nitromethane.

It melted at 250°–255°C with decomposition. 0.01 mole of this quaternary salt was dissolved in 100 ml of water and 50 ml of concentrated ammonium hydroxide were added. The reaction mixture was extracted with diethyl ether and dried upon sodium sulphate. By evaporating the ether solution and cooling a white precipitate was obtained having a melting point of 118°–120°C and corresponding to the formula:

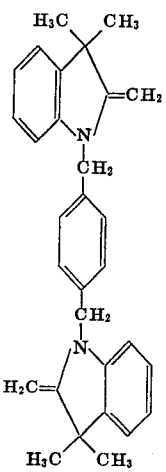

B. Preparation of 1,1'(pentamethylene)-bis(2,3,3-trimethyl-3H-indolium iodide)

0.02 mole of 1,5-diiodopentane and 0.04 mole of 2,3,3-trimethyl-3H-indole were dissolved in 50 ml of nitromethane and refluxed for 24 hours. The reaction mixture was thereafter poured into diethyl ether whereby a dark gummy product precipitated. This precipitate was stirred with a small amount of ethanol whereafter a powdery solid remained which was recrystallized from a benzene-ethanol mixture.

Yield: 42 percent of product melting at 267°–268°C and corresponding to the formula:

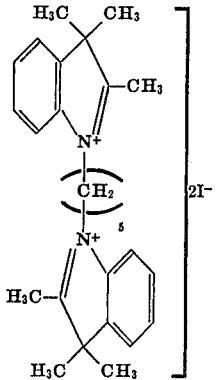

The 1,2-dimethylene, 1,4-tetramethylene and 1,10-decamethylene homologues can also be obtained by replacing the 1,5-diiodopentane in the above mentioned reaction with 1,2-dibromoethane, 1,4-diiodobutane or 1,10-dibromodecane.

C. Preparation of β,β'-bis[1-(2,3,3-trimethyl)-3H-indolium iodide]diethyl ether 0.04 mole of β,β'-diododiethyl ether and 0.08 mole of 2,3,3-trimethyl-3H-indole were dissolved in 100 ml of nitromethane and refluxed for 24 hours. The reaction mixture was then poured into diethyl ether and a dark gummy residue precipitated. This residue was stirred with a small amount of ethanol and a powder solid remained as precipitate which was filtered off and recrystallized from a benzene-ethanol mixture.

Yield: 38,75 percent of product melting at 243°–244 °C and corresponding to the formula:

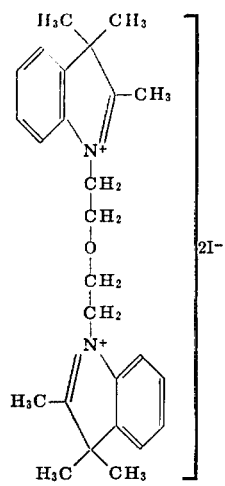

D. Preparation of 1, 1'(2-butenylene)-bis(2,3,3trimethyl-3H-indolium bromide)

0.04 mole of 1,4-dibromo-2-butene and 0.08 mole of 2,3,3-trimethyl-3100 ml of methylethylketone and refluxed overnight. The product separated out during refluxing. It was filtered off and recrystallized from a benzene-ethanol mixture.

Yield: 52.5 percent of a product melting at 274°–27 5°C and corresponding to the formula:

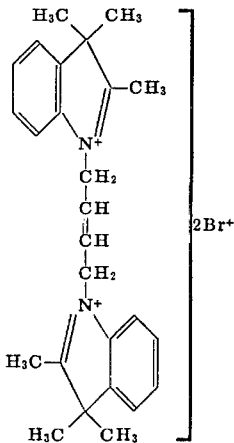

The disalicylaldehydes were prepared as follows:
A. The 5,5'-methylene-disalicylaldehyde which has the formula:

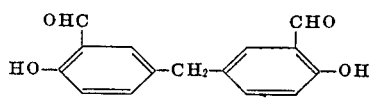

was prepared according to the procedure outlined by Marvel and Tarkoy in J.Am. Chem.Soc. 79, 6001 (1957).

B. Preparation of 5,5'-methylene-3,3'-dinitrodisalicylaldehyde 13 g of 5,5'-methylene disalicylaldehyde were dissolved in 250 ccs of acetic acid. To this solution 12 ccs of fuming nitric acid were added dropwise at room temperature within 15 min. The temperature rose to 40°C. The reaction mixture was then stirred for 30 min. more, whereupon the precipitate was sucked off and recrystallized from dioxan. The product was then purified further with 250 ccs of acetonitrile.

Yield: 6 g of 5,5'-methylene-3,3'-dinitro-disalicylaldehyde according to the formula:

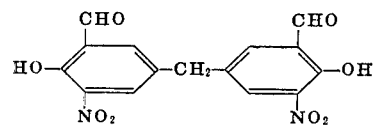

C. The 5,5'-disalicylaldehyde of the formula:

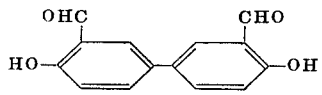

was prepared according to the method described in French Pat. specification No. 1,451,332.

D. Preparation of 3,3-dinitro-5,5'-disalicylaldehyde 3.6 g of 5,5'-disalicylaldehyde were suspended in 150 ccs of acetic acid. Then 3.6 ccs of fuming nitric acid ($d = 1.5$) were added dropwise at room temperature within 5 to 10 min., whereby the mixture turned yellow. It was then heated on a water bath to 45°–50°C. Stirring was continued for 1 h at this same temperature. The paste got thicker and the yellow color was intensifying.

The mixture was then cooled to room temperature. The precipitate was sucked off and washed with 25 ccs of acetic acid.

The resulting product was recrystallized first from 300 ccs of dichloroethane and then from 100 ccs of dioxan. Subsequently it was dried under reduced pressure.

Yield: 3 g of 3,3'-dinitro-5,5'-disalicylaldehyde according to the formula:

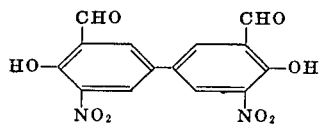

The polycondensates of the invention are photochromic, i.e., they change color or opacity when exposed to light. On exposure such polycondensates undergo reversible color changes in such a way that they get colored or change color under the influence of light of certain wavelengths, whereas on irradiation with other and usually longer wavelengths they show a tendency to revert to the colorless state or to the original color. Though more slowly, the color generally reverses even when the polycondensates are kept in the dark after exposure.

In order to expose the photochromic polycondensates they may be dissolved or they may be applied in the form of a layer on a support, occasionally after having been dispersed in a suitable binding agent, e.g., a lacquer. They can be used then in optical filter systems, e.g., in sun glasses or in films, which show a temporary increase of the optical absorption in certain spectral fields in proportion to the action of the light. They can be used in a very interesting manner in window materials in buildings and motor-cars, wherein they screen off the bright sunlight automatically.

The photochromic polycondensates of the invention generally show a much slower discoloration than the known dimeric photochromic compounds. This can be used in photographic reproduction techniques wherein the so-called "dodging" method is applied. It is known, indeed, that in photography photochromic layers can serve as masks for the diminution of contrast in a copying process. Between a negative and a copying material a photochromic layer is applied, which upon exposure yields a positive mask and thereby decreases the contrast of the negative automatically. Since the photochromic polycondensates of the invention possess a much slower discoloration, positive masks on the basis of photochromic polycondensates according to the invention can be used for dodging several prints before they become useless as a result of discoloration.

The invention is illustrated by the following examples.

EXAMPLE 1

0.01 mole of 5,5'-methylene-3,3'-dinitro-disalicylaldehyde and 0.01 mole of 1,1'(p-phenylene dimethylene)-bis(3,3-dimethyl-2-methylene-indoline) are dissolved in 50 ml pyridine and refluxed for 5 hours. The mixture was poured in methanol and the precipitate was filtered off. This precipitate was further purified twice by dissolving in tetrahydrofuran and precipitating in methanol.

The molecular weight of the polycondensate was determined and found to be 5,000. The polycondensate was formed of recurring units of the formula:

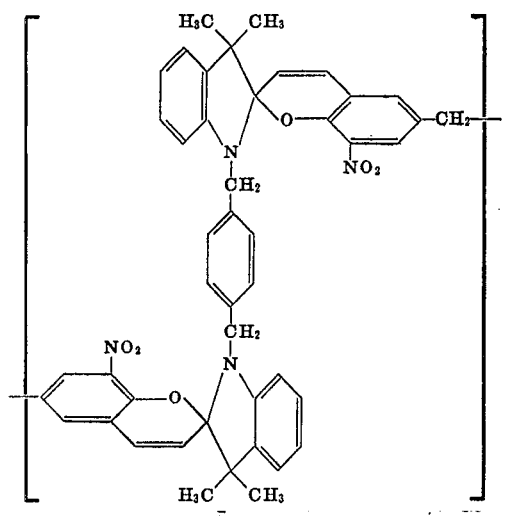

Upon exposure to ultra-violet light the color of a solution of this polycondensate in dimethylformamide changed into blue ($\lambda$ = 623 m$\mu$). When kept in the dark at 10°C the coloration of the solution disappeared two times slower than the color of a corresponding dimer.

EXAMPLE 2

The process of Example 1 was repeated with the difference, however, that as disalicylaldehyde 3,3'-dinitro-5,5'-disalicylaldehyde was used.

A polycondensate was obtained having a molecular weight of 6,410 and composed of structural units of the formula:

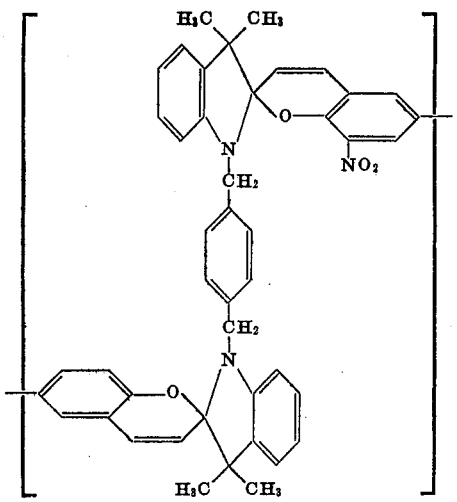

Upon exposure to ultra-violet radiation the color of a solution of this polycondensate in dimethylformamide changed into blue ($\lambda_{max}$ = 663 m$\mu$). When kept in the dark at 25°C the coloration of the solution disappeared 2 times slower than the color of a corresponding dimer.

EXAMPLE 3

3 g (0.00467 mole) of 1,1'(pentamethylene)-bis-2,3,3-trimethyl-3H-indolium iodide) and 1.61 g (0.00467 mole) of 5,5'methylene-3,3'-dinitro-disalicylaldehyde were dissolved in 150 ml of pyridine and refluxed for 5 hours. The reaction mixture was then poured into methanol whereupon a bluish-green solid precipitated. This solid was dissolved in tetrahydrofuran and again poured out into methanol. This procedure was repeated. The product was dried and 1.10 g of polycondensate was obtained having a molecular weight of about 4,000 and formed of recurring units of the formula:

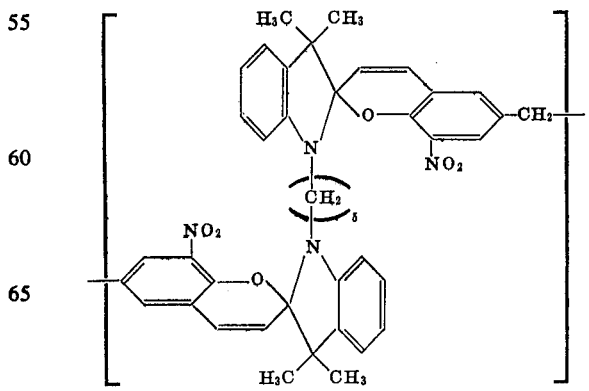

Upon exposure to ultraviolet radiation the color of the solution of this polycondensate in dimethylformamide changed into blue ($\lambda_{max} = 617$ m$\mu$). When kept in the dark the coloration of the solution disappeared 2 times slower than the color of the corresponding dimer.

EXAMPLE 4

The process of Example 3 was repeated with the difference, however, that the bis-3H-indolium salt was replaced by $\beta,\beta'$-bis[1-(1,3,3-trimethyl)-3H-indolium iodide]-diethyl ether.

1.5 g of polycondensate was obtained having a molecular weight of 3,775 and composed of recurring units of the formula:

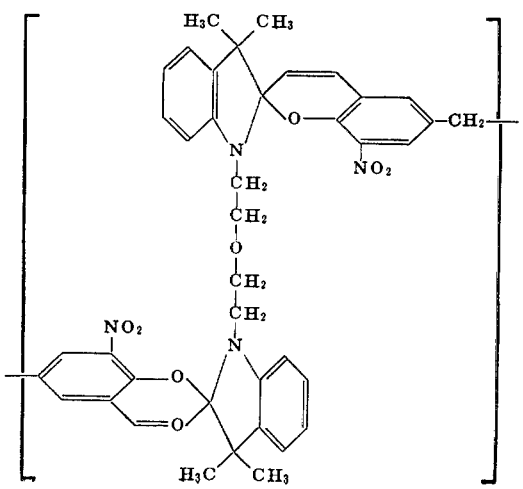

Upon exposure to ultra-violet radiation the color of the solution of this polycondensate in dimethylformamide changed into blue ($\lambda_{max} = 22$ m$\mu$). When kept in the dark at 25°C this coloration disappeared 2 times slower than the color of the corresponding dimer.

EXAMPLE 5

The process of Example 3 was repeated, with the difference, however, that the bis-3H-indolium salt was replaced by 1.5 g of 1,1'-(2-butenylene)-bis(2,3,3-trimethyl-3H-indolium bromide).

1.2 g of polycondensate was obtained having a molecular weight of 3,650 and which was composed of recurring units of the formula:

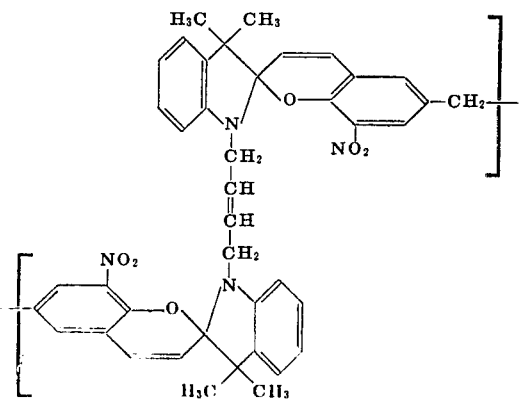

We claim:
1. A polycondensate of the formula:

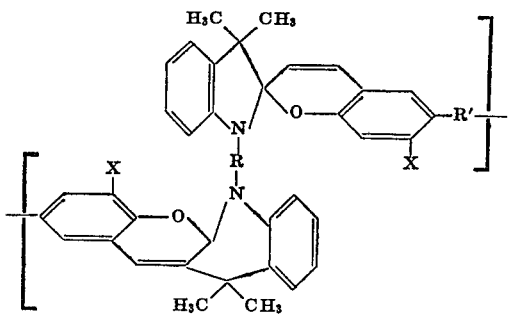

wherein:

R represents

—CH$_2$—CH$_2$—O—CH$_2$—CH$_2$—, —CH$_2$—$_{CH=CH}$—$_{CH_2}$—, or —(CH$_2$)$_n$— wherein $n$ is 2 or an integer from 4 to 10, X represents a hydrogen atom or a nitro group, and
R' represents a single bond or a methylene group.

2. The polycondensate of claim 1 wherein R is

3. The polycondensate of claim 2 wherein R' is methylene.
4. The polycondensate of claim 3 wherein X is nitro.
5. The polycondensate of claim 2 wherein R' is a single bond.
6. The polycondensate of claim 5 wherein X is hydrogen.
7. The polycondensate of claim 1 wherein R is —CH$_2$—CH$_2$—O—CH$_2$—CH$_2$—.
8. The polycondensate of claim 7 wherein R' is methylene.
9. The polycondensate of claim 8 wherein X is nitro.
10. The polycondensate of claim 1 wherein R is —CH$_2$—CH=CH—CH$_2$—.
11. The polycondensate of claim 1 wherein R is —(CH$_2$)$_n$—wherein $n$ is 2 or an integer from 4 to 10.

* * * * *